United States Patent [19]
Eldred

[11] 3,988,227
[45] Oct. 26, 1976

[54] OIL-RESISTANT EPDM ELASTOMER
[75] Inventor: Roger J. Eldred, Detroit, Mich.
[73] Assignee: General Motors Corporation, Detroit, Mich.
[22] Filed: Apr. 28, 1975
[21] Appl. No.: 572,976

[52] U.S. Cl. .................. 204/159.17; 260/42.33; 260/42.37; 260/878 R
[51] Int. Cl.² .................. C08F 8/00; C08K 5/54; C08L 23/16
[58] Field of Search .............. 204/159.15, 159.17; 260/885, 878 R

[56] References Cited
UNITED STATES PATENTS

| | | | |
|---|---|---|---|
| 3,084,115 | 4/1963 | Smith et al. | 204/159.17 |
| 3,542,661 | 11/1970 | Klopfer et al. | 204/159.17 |
| 3,627,658 | 12/1971 | Ryffel | 204/159.18 |
| 3,650,669 | 3/1972 | Osborn et al. | 204/159.15 |
| 3,789,042 | 1/1974 | Colomb et al. | 204/159.2 |
| 3,852,177 | 12/1974 | Atchison et al. | 204/159.17 |
| 3,894,118 | 7/1975 | Aronoff et al. | 260/884 |

Primary Examiner—Murray Tillman
Assistant Examiner—Thurman K. Page
Attorney, Agent, or Firm—George A. Grove

[57] ABSTRACT

In accordance with a preferred embodiment of this invention, a high temperature oil resistant ethylene-propylene-diene monomer (hereinafter EPDM) elastomer is produced. This product is basically the high energy radiation induced reaction product of, by weight, about 100 parts of an uncured conventional EPDM elastomer, from 15 to 25 parts of trimethylolpropanetrimethacrylate (hereinafter TMPT), from 15 to 80 parts of a reinforcing filler and from 0 to 40 parts of an extender oil.

3 Claims, No Drawings

OIL-RESISTANT EPDM ELASTOMER

FIELD OF THE INVENTION

This invention relates to radiation cured EPDM elastomers.

BACKGROUND OF THE INVENTION

EPDM elastomers, which are cured by the conventional sulfur vulcanization process, possess many very attractive durability properties. Outstanding among these are a high resistance to heat and a resistance to degradation by either oxygen or ozone. Two shortcomings which have limited the use of this material are the relatively long cure time and, in particular, a relatively poor resistance to oil at elevated temperatures; these drawbacks have prevented this material from being used in seal applications such as those found in automotive transmissions and differentials. Often, neoprene is the only acceptable material for these applications and occasional supply problems have generated an interest in developing substitute materials.

OBJECTS OF THE INVENTION

It is an object of this invention to produce a radiation-cured, high temperature oil-resistant EPDM elastomer suitable for use in applications such as automotive seals.

It is a further object of this invention to provide a high temperature oil-resistant elastomer which is essentially the high energy radiation induced reaction product of about 100 parts by weight of an uncured EPDM elastomer and from 5 to 40 parts by weight of an acrylic cross-linking monomer having two or more points of ethylenic unsaturation and from 15 to 80 parts by weight of a reinforcing filler such as carbon black. This oil resistant composition is formed by subjecting the above ingredients to a radiation dose of from about 10 to 30 Mrads.

It is a further object of this invention to provide a radiation cured EPDM elastomer having a volume swell, as measured by ASTM D-471-68, of about one-half that of sulfur-cured EPDM elastomers after 70 hours in ASTM No. 3 Oil at 150° C.

SUMMARY OF THE INVENTION

In accordance with a preferred embodiment of this invention, these and other objects are accomplished by providing a radiation curable composition containing about 100 parts by weight of an uncross-linked EPDM copolymer, and uniformly dispersed therethrough, from 15 to 80 parts by weight of a reinforcing filler such as carbon black, silica and some talcs, and from 15 to 25 parts by weight of a polymerizable acrylic cross-linking monomer having two or more points of ethylenic unsaturation. This composition is then exposed to from 10 to 30 Mrads of high energy electron beam radiation, after which the elastomer will have an equilibrium volume swell fraction $v_2$ in toluene of from about one-fourth to about one-half.

An elastomer prepared in accordance with the practice of this preferred embodiment exhibits a volume swell of about 100 percent when exposed to ASTM No. 3 Oil for 70 hours at 150° C. as measured in accordance with ASTM Test D-471-68. Comparatively, typical sulfur-cured EPDM elastomers show a volume swell of more than 200 percent when tested in this manner. Neoprene exhibits a swell of only from 75 to 85 percent.

DETAILED DESCRIPTION OF THE INVENTION

In accordance with this invention, a modified radiation cured EPDM elastomer having improved oil-resistant properties is produced. This is achieved by the addition of a polymerizable acrylic cross-linking monomer having two or more points of ethylenic unsaturation to the EPDM composition prior to the radiation curing process. This technique unexpectedly produces an oil-resistant elastomer from a base material typically known for its poor oil-resistant properties.

Suitable acrylic cross-linking monomers include but are not limited to trimethylolpropanetrimethacrylate (TMPT), trimethylolpropanetriacrylate (TMPTA), ethylene glycol dimethacrylate (EDMA), ethylene glycol diacrylate (EDA), polyethylene glycol dimethacrylate, polyethylene glycol diacrylate, dipentaerythritol monohydroxy pentaacrylate, and the like.

A suitable radiation curable composition which will exhibit improved oil resistance contains for each 100 parts by weight of an uncured conventional EPDM copolymer having 3% to 10% by weight of an unsaturated component, 5 to 40 parts by weight of a polymerizable acrylic cross-linking monomer which has two or more points of ethylenic unsaturation, such as TMPT and ethylene glycol dimethacrylate (hereinafter EDMA), from 15 to 80 parts of a reinforcing filler, such as the carbon black marketed under the ASTM grade designation N-550, or a silica such as that marketed under the trade designation HiSiL 233, and from 0 to 40 parts by weight of an extender oil such as that marketed by Sun Oil Company under the tradename Sunpar 2280. All materials are commercially available and may be used in the "as received" condition.

Suitable polymers include those EPDM resins marketed under the tradename Epcar by the B.F. Goodrich Corporation, the Vistalon series of EPDM elastomers marketed by Exxon, the Nordel materials marketed by E.I. DuPont de Nemours Corporation and the Royalene resins marketed by Uniroyal. These materials vary in ethylene content from about 45 to 70 parts by weight and in propylene content from about 30 to 55 parts by weight and the concentration of an unsaturated component may vary from 3 to 8 percent by weight. It is to be noted that each point of unsaturation provides a potential cross-linking point and that the high temperature oil resistance of the subject compositions is substantially independent of the level of unsaturation above about that provided by 3% by weight of the unsaturated component. From this it is evident that the concentration of the unsaturated component could be lowered below the 3% by weight level without an abrupt loss of the high temperature oil resistance property.

The unsaturation type in the Epcar and Vistalon series of materials is that found in bicyclic strained rings such as that provided by 5-ethylidene-2-norbornene while the DuPont material, Nordel, is characterized by the type of ethylenic unsaturation found in the linear 1,4, hexadiene. It is to be noted at this point that the unexpected oil-resistant property found in the subject composition is not dependent upon the type of ethylenic unsaturation found in the EPDM polymer. Similarly, this unexpected property is also substantially independent of the type of acrylic cross-linking monomer used.

It is also to be emphasized that, in general, the subject radiation cured composition has physical properties which, for the most part, are comparable to that of the sulfur-cured composition with the notable exception of the desired high temperature oil-resistant property which is greatly improved. From this, it is evident that the subject composition could be used in almost any application where the sulfur-cured compositions have proved successful. In addition, this similarity allows the use of many of the fillers and additives, conventionally used in sulfur-cured EPDM compositions, in the radiation cured elastomers. For example, various reinforcing fillers such as carbon black, silica and some talcs may be used. Similarly, nonreinforcing particulate fillers such as thermal black and clays may be used in quantities which raise the total filler concentration to about 150 parts by weight of filler per about 100 parts by weight of polymer. In addition, typical extender oils such as Sun Oil Company's Circosal 4240, Sunpar 150, and Sunpar 110 may also be used. It should be emphasized that the use of these various additives will alter the physical properties of the elastomer and may be used to tailor the material for specific applications.

The radiation curable compositions used in the development of this invention were typically prepared in accordance with conventional practices; that is, the elastomer was first banded onto a two-roll mill and then the filler material and the acrylic cross-linking monomer were added as the elastomer was masticated on the rolls. Once the elastomeric composition was stripped from the mill, samples were compression molded at a temperature of typically from about 60° to 70° C. for a period of from 5 to 10 minutes and then subjected to the high energy electron beam radiation. In the following examples which illustrate the subject invention, the samples were allowed to cool to room temperature before demolding and then were placed in polyethylene bags, flushed with nitrogen, sealed, and radiated.

The radiation source employed in this series of experiments was a Radiation Dynamics 1.5 MEV Electron Accelerator. The maximum current capacity was 15 milliamps which yielded 22,500 watts. The samples were radiated by placing them on a motorized cart which ran past the exit slit of the accelerator. The radiation dose and dose rate were readily controlled by varying the cart speed, the current, and/or the number of passes. Generally, the samples were radiated at a current of 4.2 milliamps and a cart speed of 40 centimeters per second which supplied a dose per pass of about one-fourth Mrad.

The elastomers produced in accordance with the practice of this invention exhibit a much improved oil-resistant property which makes them suitable for applications in which neoprene was previously the only commercially feasible elastomeric material. This is an unexpected property because sulfur-cured EPDM compositions traditionally exhibit very poor resistance to oil at elevated temperatures. In addition, the radiation curing of elastomeric compositions other than EPDM containing the same acrylic cross-linking monomers did not produce an improvement in the oil resistance of the cured elastomer. For example, referring to Table I, the sulfur cured SBR elastomer, which is a styrene-butadiene rubber elastomer, exhibited a better resistance to oil than the radiation cured SBR composition when tested in accordance with ASTM D-471-68 after exposure for 70 hours and ASTM No. 3 Oil at 150° C. Comparatively, an NBR elastomer showed no change in oil resistance when the curing technique was changed from the conventional sulfur vulcanization to a radiation curing process. Similarly, a polyacrylate material showed an improvement of less than 3 percentage points in the swell when the method of curing was changed from a sulfur vulcanization to a radiation technique.

At this point, the reason why a radiation method of curing the EPDM elastomeric composition produces the improved oil resistance is not thoroughly understood. However, it is apparent that when the acrylic cross-linking monomer is blended into the elastomer, the two materials are relatively immiscible and the filler, that is typically the carbon black, serves to carry the acrylic cross-linking monomer throughout the elastomer as the composition is blended on the two-roll mill. Furthermore, once the radiation begins, spectrographic data indicate that the acrylic cross-linking monomer has a tendency to first polymerize and form an acrylic homopolymer which has a relatively low molecular weight; then as the radiation continues, the acrylic oligimers then begin to react with and cross-link the EPDM polymer matrix. This initial homopolymerization process can create unusual cross-linking species having many chemically active points of unsaturation. For example, if two of the TMPT molecules react and form a dimer, this material will have 4 points of ethylenic unsaturation; similarly a trimer will have 5 points of unsaturation and so on. Apparently, this type of cross-linking species promotes the oil resistance of the final radiation cured product.

In addition to the radiation curing technique, the extent of cure, that is the degree of cross-linking, has a significant effect on the oil resistance of the final product. One of the concepts inherent to radiation curing is that the state of cure, as determined by the cross-link density, is dependent upon the radiation dose. Unlike a sulfur or peroxide cure, in which the network forming agents become depleted and curing ceases, the radiation technique is capable of continued cross-linking with continued dosage. This presents a problem of determining when "a normal state of cure" is obtained and it is necessary when comparing the oil resistance of a sulfur-cured EPDM elastomer which that of a radiation cured EPDM elastomer to do so at the same state of cure. The technique which has been used to determine a normal state of cure is the volume swell fraction, $v_2$, of the elastomer in toluene. Since conventional sulfur cured EPDM elastomers have a $v_2$ value of 0.35, this was assumed to be the normal state of cure for a radiation cured EPDM elastomer. This equilibrium solvent swelling technique has been shown by P. J. Flory in his *Principles of Polymer Chemistry* published by the Cornell University Press, Ithaca, N.Y. 1953 at page 579, to be a measurement of the cross-linked density of unfilled elastomers. This technique involves immersing the samples in toluene at room temperature until equilibrium swelling has been obtained, which usually requires about 5 days; an anti-oxidant is typically used in the solvent to inhibit oxidation. The solvent is then changed and at least 2 days are allowed to lapse before the volume swell fraction of the elastomer is determined gravimetrically. The reported figure $v_2$ is the ratio of the original volume of the sample to the equilibrium volume of the sample plus the solvent. It is emphasized that the equilibrium volume swell ratio, $v_2$, cannot be used to obtain the actual value of the cross-linked density but only as an indication of changes in the cross-linked density since Flory's theoretical relationship between the molecular weight between cross-links and $v_2$, is valid only for non-filled elastomers. The reason for this limit is apparently a nonhomogeneous stress field generated by the restriction of swelling at the polymer filler interface. However, when comparing equally filled samples, the technique is valid to determine any changes in cross-linking density and approximating the state of cure. In accordance with the practice of this invention, suitable radiation cured EPDM elastomers will have an equilibrium volume swell fraction in toluene of from about one-fourth to about one-half and preferably from about 0.33 to about 0.45.

In addition to the curing technique and the state of cure, the amount and type of filler, and extender oil has some small but measurable effect on the oil resistance of the radiation cured EPDM composition. This effect is evident from Table II which lists the volume swell in ASTM No. 3 Oil after 70 hours at 150° C. as measured in accordance with ASTM D-471-68 of radiation cured and sulfur cured EPDM elastomers containing various amounts of carbon black and extender oil. It should be noted that even though the loading of these materials in the elastomer does have a small but measurable effect on the oil resistance, the unexpected increase in oil resistance of a radiation cured EPDM elastomer as compared to sulfur cured EPDM elastomers is still very evident.

EXAMPLE I

In this and each of the following examples, the subject EPDM elastomeric compositions were prepared in accordance with the conventional technique generally described above. All materials were used as received from commercial sources. In this example 100 parts by weight of a noncured EPDM elastomer supplied by the B.F. Goodrich Company under the name Epcar 545 were banded onto a two-roll laboratory mill. This elastomer contains about 48 percent ethylene, 48 percent propylene, and an unsaturation level of from 3 to 4 percent. The unsaturation is provided by the bicyclic strained ring present in 5-ethylidene-2-norbornene. As the uncured elastomer was being milled, 40 parts by weight of carbon black N-550 was added along with 10 parts by weight of TMPT. Once these ingredients were thoroughly blended, the composition was stripped from the mill and compression molded into tensile slabs at a temperature of about 65° C. for about 7 minutes. To avoid deformation of the samples the mold was allowed to cool at least 15° C. before demolding. The samples were then placed in a polyethylene bag which was flushed with nitrogen and sealed in preparation for radiation. Radiating the samples in a nitrogen atmosphere, as compared to air, promoted reproducible results by eliminating any effects of oxygen at the surface. It is believed that no curing, i.e. cross-linking, occurred during the molding operation.

The noncured tensile slabs were then placed on a cart and passed under the radiation beam produced by a 1.5 MEV Dynamitron Electron beam accelerator having a maximum current capacity of 15 milliamps. In this example, the slabs were radiated at a current of 4.2 milliamps, a cart speed of 40 centimeters per second which is the equivalent to about one-fourth Mrad per pass. A total radiation dose of 16 Mrads was used in this particular example. As mentioned above, the extent of cure was measured by determining the equilibrium swelling of the material in toluene at 25° C. No attempt was made to relate to the swell ratio to the actual cross-linked density.

To measure the oil resistance of this elastomeric composition, it was immersed in ASTM No. 3 Oil for a period of 70 hours at a temperature of 150° C. The swelling was then measured in accordance with D-471-68 and reported as percent swell of the original volume. This data was then compared with the percent swell of sulfur cured EPDM elastomeric compositions. It should be noted, however, that in making this comparison, it is necessary to also corrolate the extent of cure as measured by the equilibrium swell ratio in toluene. This is necessary since an elastomeric composition having a high cross-link density will exhibit more oil resistance than a material with a lower cross-link density. However, when sulfur cured and radiation cured systems having essentially the same state of cure, i.e. equilibrium volume swell fraction, $v_2$, are evaluated in terms of their oil resistance, the radiation cured samples are far superior. The data from this example is reported in the first line of Table I. For comparative purposes, sulfur cured EPDM samples having various degrees of cure are listed on the right-hand side of Table I.

EXAMPLE II

In accordance with the procedures outlined in Example I, an additional series of experiments dealing with various EPDM compositions and acrylic cross-linking monomers to include both TMPT and EDMA were compounded, irradiated and evaluated. In addition, the NBR elastomer, SBR elastomer and the polyacrylate compositions, mentioned above, were evaluated in both the radiation cured and sulfur cured form.

The sulfur cured or vulcanized EPDM elastomer as prepared for comparative purposes in this series of experiments and the properties in which are included in Table I contain about 100 parts of uncured EPDM polymer, 40 parts by weight of carbon black, 5 parts by weight of zinc oxide, 1 part by weight of stearic acid, 1½ parts of sulfur and one-half part of MBTS and 1½ parts of TMTD. This composition was then cured for a period of about 20 minutes at 160° C.

EXAMPLE III

To determine the effect of the loading of carbon black and extender oil, a series of experiments were run using compositions containing various amounts of each of these additives. Compositions having this same loading were then cured by radiation and by the conventional sulfur curing process. In the radiation cured samples the monomer concentration was maintained at a level of 15 parts by weight of monomer per 100 parts by weight of elastomer plus extender oil. This was done to maintain a relatively constant cure rate. The compositions were prepared and radiated in accordance with the procedures described in Example I and the data is recorded in Table II.

While my invention has been described in terms of certain specific embodiments, other forms thereof could readily be adapted by one skilled in the art. Therefore, the scope of the invention is not to be limited to the specific embodiments which have been included for illustrative purposes only.

TABLE I

| Compound | Monomer (phr) | Radiation Cured v2 | % Swell[2] | Sulfur Cured v2 | % Swell |
|---|---|---|---|---|---|
| EPDM resins[1] | | | | | |
| 1. Epcar 545 | TMPT (10) | 0.372 | 120 | 0.353 | 282 |
| | | 0.274 | 200 | | |
| | EDMA (10) | 0.349 | 136 | | |
| 2. Epcar 585 | TMPT (10) | 0.350 | 129 | 0.348 | 212 |
| | | 0.262 | 200 | | |
| | EDMA (10) | 0.332 | 143 | | |
| 3. Vistalon 6505 | TMPT (10) | 0.394 | 108 | 0.336 | 225 |
| | EDMA (10) | 0.377 | 116 | | |
| 4. Nordel 1070 | TMPT (10) | 0.306 | 164 | 0.319 | 413 |
| SBR 1500 | | 0.232 | 159 | 0.240 | 150 |
| NBR Hycar 1034 (37% Nitrile | | 0.247 | 20 | 0.238 | 20 |
| POLYACRYLATE Hycar 4042 | | 0.358 | 21 | 0.234 | 24 |

[1]Radiation Cured Composition
Polymer — 100 parts by weight
N-550 Carbon Black — 40 parts by weight
TMPT — 10 parts by weight Sulfur Cured Composition
Polymer — 100 parts by weight
N-550 Carbon Black — 40 parts by weight
Zinc Oxide — 5 parts by weight
Stearic Acid — 1 part by weight
Sulfur — 1.5 parts by weight
MBTS (2,2′ benzothiazyl disulfide) — 0.5 part by weight
TMTD (tetramethylthiuram disulfide) — 1.5 parts by weight

[2]Volume Swell in ASTM No. 3 Oil After 70 hours at 150° C. ASTM D-471-68

TABLE II

COMPARISON OF OIL RESISTANCE OF RADIATION AND SULFUR CURED EPDM COMPOUNDS

| Ratio of Black/Oil (phr) | Radiation Cured[1] | | | | Sulfur Cured[2] | | | |
|---|---|---|---|---|---|---|---|---|
| | Vistalon 5600 | | Vistalon 6505 | | Vistalon 5600 | | Vistalon 6505 | |
| | v2 | % Swell | v2 | % Swell | v2 | % Swell | v2 | % Swell |
| 60/20 | 0.408 | 99 | 0.389 | 100 | 0.358 | 249 | 0.354 | 247 |
| 60/30 | 0.382 | 102 | 0.358 | 108 | 0.340 | 261 | 0.337 | 226 |
| 70/20 | 0.419 | 86 | 0.390 | 96 | 0.366 | 228 | 0.361 | 208 |
| 70/30 | 0.371 | 103 | 0.360 | 101 | 0.349 | 241 | 0.339 | 211 |
| 80/20 | 0.416 | 85 | 0.396 | 89 | 0.374 | 212 | 0.363 | 194 |
| 80/30 | 0.383 | 96 | 0.369 | 99 | 0.363 | 233 | 0.350 | 194 |
| 80/40 | 0.364 | 100 | 0.336 | 109 | 0.360 | 199 | 0.358 | 187 |

NOTES:
Percent Volume Swell in ASTM No. 3 Oil, 70 hours at 150° C.
and Measured According to ASTM Test D-471-68
[1]Composition - 15 parts of TMPT per 100 parts of elastomer plus extender oil
[2]Composition
Polymer — 100 parts by weight
N-550 Carbon Black — 40 parts by weight
Zinc Oxide — 5 parts by weight
Stearic Acid — 1 part by weight
Sulfur — 1.5 parts by weight
MBTS (2,2′ benzothiazyl disulfide) — 0.5 parts by weight
TMTD (tetramethylithiuram disulfide) — 1.5 parts by weight

What is claimed is:

1. A high temperature, oil resistant elastomer having an equilibrium volume swell fraction, $v_2$, in toluene of from about one-fourth to about one-half produced by subjecting a uniform mixture to from 10 to 30 Mrads of high energy ionizing radiation, said mixture comprising by weight from about 5 to about 40 parts of a polymerizable acrylic cross-linking monomer having two or more points of ethylenic unsaturation and from about 15 to 80 parts of a reinforcing filler and about 100 parts of an uncured ethylene-propylene-diene monomer elastomer.

2. A high temperature, oil resistance elastomer having an equilibrium volume swell fraction, $v_2$, in toluene of from about one-fourth to about one-half produced by subjecting a uniform mixture to from 10 to 30 Mrads of high energy ionizing radiation said mixture comprising by weight: (a) from about 5 to about 40 parts by weight of trimethylolpropanetrimethacrylate, (b) from about 15 to 80 parts by weight of reinforcing carbon black and (c) about 100 parts by weight of an uncured ethylene-propylene-diene monomer elastomer.

3. A high temperature, oil resistant elastomer having an equilibrium volume swell fraction, $v_2$, in toluene of from about one-fourth to about one-half produced by subjecting a uniform mixture to a high energy ionizing radiation dose of from 10 to 30 Mrads, said mixture comprising by weight: (a) from about 5 to about 40 parts by weight of a polymerizable acrylic cross-linking monomer selected from the group consisting of trimethylolpropanetrimethacrylate, ethylene glycol dimethacrylate, trimethylolpropanetriacrylate, ethylene glycol diacrylate, polyethylene glycol dimethacrylate and polyethylene glycol diacrylate, (b) from about 15 to 80 parts of a reinforcing filler and (c) about 100 parts of an uncured ethylene-propylene-diene monomer elastomer.

* * * * *